United States Patent [19]

Still et al.

[11] 4,231,389
[45] Nov. 4, 1980

[54] REMOVABLE OPERATOR FOR GATE VALVES

[75] Inventors: Robert C. Still; Frank J. Huppenthal; Barbara J. Smith; Gerald H. Scotney, all of Tucson, Ariz.

[73] Assignee: New Concepts, Inc., Tucson, Ariz.

[21] Appl. No.: 942,768

[22] Filed: Sep. 15, 1978

[51] Int. Cl.³ .............. F16K 43/00; F16K 31/54
[52] U.S. Cl. ..................... 137/315; 251/89; 251/250; 251/291; 251/326
[58] Field of Search ............ 74/422, 424.8 VA; 137/315; 251/89, 90, 250, 291, 326, 292

[56] References Cited

U.S. PATENT DOCUMENTS

| | | | |
|---|---|---|---|
| 1,028,497 | 6/1912 | Schmid et al. | 251/250 |
| 1,497,946 | 6/1924 | Schmidt | 251/250 |
| 1,801,237 | 4/1931 | Hanson | 251/250 |
| 2,055,347 | 9/1936 | Hackman | 251/89 |
| 2,150,813 | 3/1939 | Ball | 74/424.8 VA |
| 2,223,702 | 12/1940 | Penick et al. | 251/250 |
| 2,297,597 | 9/1942 | White | 251/291 |
| 2,730,130 | 1/1956 | Guidry | 251/250 |
| 3,034,371 | 5/1962 | Cantalupo et al. | 251/291 |

Primary Examiner—Martin P. Schwadron
Assistant Examiner—G. L. Walton
Attorney, Agent, or Firm—Cahill, Sutton & Thomas

[57] ABSTRACT

A pedestal extends upwardly from the body of a gate valve housing in a straddling relationship to the gate. An operator, detachably attachable to the pedestal, includes a hand wheel operating through a pinion gear to impart translatory movement to a vertically oriented rack. A clevis is disposed at the lower extremity of the rack for attachment through a pin to the upper end of the gate. A removable pin is employed to secure the gate, in either a raised or a lowered position, to the pedestal and to maintain the gate in position after removal of the operator.

24 Claims, 6 Drawing Figures

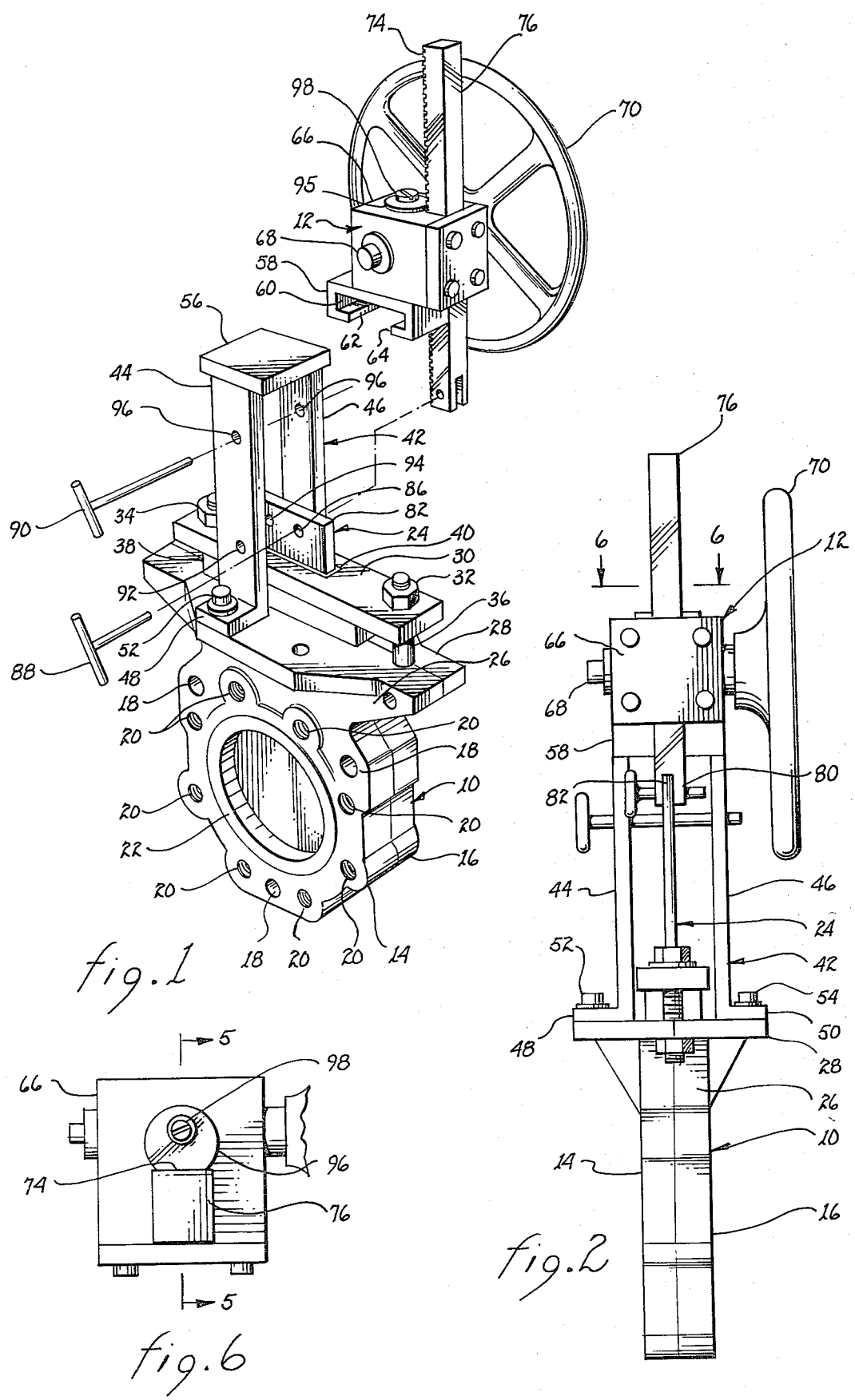

REMOVABLE OPERATOR FOR GATE VALVES

The present invention relates to gate valves and, more particularly, to operators for gate valves.

Gate valves, particularly of a type used to regulate the flow of fluid in mining operations, refineries, or in fluid transmission systems, are large and expensive. Because of the nature of the environment wherein these gate valves are employed, they are generally left in the open or closed state for extended periods of time; yet, gate valves must be employed in order to provide the capability of terminating or initiating fluid flow through the pipe(s) to which they are attached.

To reduce the cost of gate valves used in such environments, many efforts have been undertaken to reduce the component costs thereof by design simplification or by the use of less expensive materials or configurations. Any such reduction in quality necessarily brings about a higher failure rate. Only for very limited applications are such higher failure rates economically feasible.

Every gate valve includes certain common components such as a gate, a body for slidably receiving the gate, seals for preventing leakage about the gate and a mechansim for raising and lowering the gate. The mechanism for raising and lowering the gate, termed an operator in the vernacular of those skilled in the art, serves only the purpose of providing sufficient mechanical advantage to permit a known source of power to raise and lower the gate. In most installations of the type discussed above, the operator consists of a screw or lever mechansim manually operated through a hand wheel or crank. Such operators are expensive and yet the need to actuate them often occurs relatively infrequently.

It is therefore a primary object of the present invention to provide a removable operator for use with any of several gate valves.

Another object of the present invention is to provide a detachably attachable operator useable with any one of a plurality of gate valves.

Yet another object of the present invention is to provide a reduced cost gate valve.

Still another object of the present invention is to reduce the cost of a gate valve without affecting its quality and failure rate.

A further object of the present invention is to provide a gate valve having a pedestal for receiving a detachable operator to raise and lower the gate.

A yet further object of the present invention is to provide a removable manually actuated operator for gate valves.

A still further object of the present invention is to provide a manually actuated rack and pinion operator which is detachably attachable to a gate of a gate valve to raise and lower the gate.

A yet further object of the present invention is to provide a means for securing the gate of a gate valve in either an open or closed position upon removal of the operator for the gate.

These and other objects of the present invention will become apparent to those skilled in the art as the description thereof proceeds.

The present invention may be described with greater specificity and clarity with reference to the following drawings, in which:

FIG. 1 is an isometric view of an operator attachable to a gate valve.

FIG. 2 is a side view of a removable operator attached to a gate valve.

FIG. 6 is a view taken along lines 6—6, as shown in FIG. 2.

Figure 3:
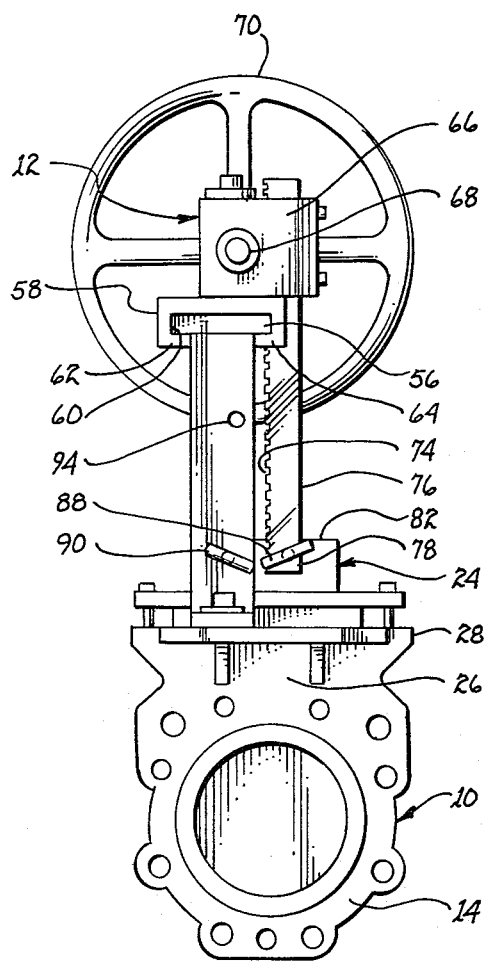
FIG. 3 is a frontal view illustrating an operator attached to a gate valve with the gate in the lowered position.

Referring jointly to FIGS. 1, 2, 3, and 4 there is shown a gate valve 10 and a detachably attachable operator 12. The gate valve includes a pair of mirror image casings 14 and 16 which are secured to one another by nut end bolt means penetrably inserted through holes 18. A plurality of threaded apertures 20 are disposed in the face of each casing to threadably receive bolts for drawing an annular flange of a to-be-attached pipe to the casing. A seat 22 is disposed intermediate and within casings 14 and 16 to sealingly receive a vertically positionable gate 24.

Gate 24 extends upwardly from within casings 14 and 16 through a chest 26, which chest is terminated at the upper end by a laterally extending flange-like member 28. A stuffing box 30 is secured to chest 26 by nuts 32 and 34 threadably engaging studs 36 and 38 extending upwardly from flange-like member 28. A seat 40 is disposed within stuffing box 30 in circumscribing relationship to gate 24 and serves as a seal between the stuffing box and the gate.

A pedestal 42 extends upwardly from flange-like member 28 in general alignment with the vertical movement of gate 24. The pedestal includes legs 44 and 46 having feet 48 and 50, respectively, secured to flange-like member 28 by Allen head bolts 52 and 54, or the like. Legs 44 and 46, straddling gate 24, support a platform 56.

Operator 12 includes a member 58 having a recess 60 formed therein and including inwardly extending ledges 62 and 64. Recess 60 is configured to matingly slidably receive platform 56 with ledges 62 and 64 precluding sliding movement of the operator with respect to the platform in other than a single axis.

A gear box 66 is mounted upon member 58. The gear box includes means for rotatably supporting a shaft 68 extending from the center of hand wheel 70. As partially illustrated in FIG. 5, shaft 68 supports a pinion gear 72. The pinion gear is in mesh with teeth 74 disposed along vertically positionable rack 76. Thereby, rotation of hand wheel 70 results in rectilinear translatory vertical movement of rack 76.

Figure 4:
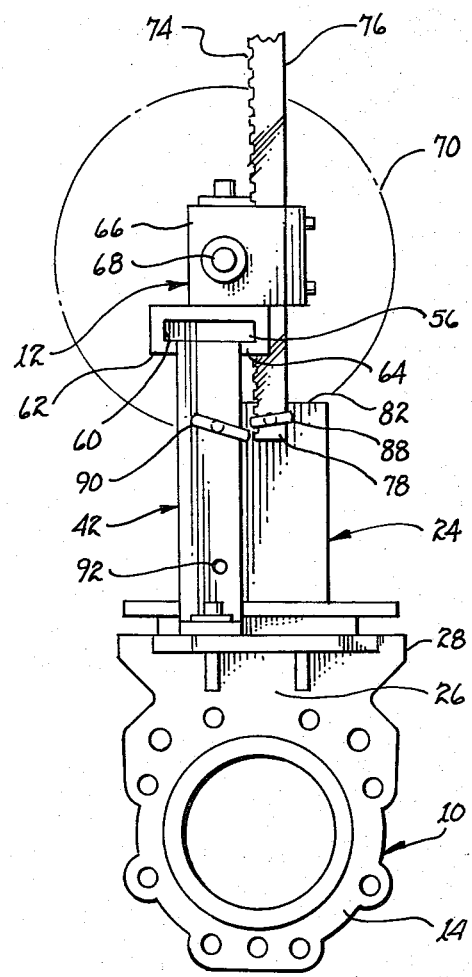
FIG. 4 is a frontal view illustrating a removable operator attached to a gate valve with the gate in the raised position.

Lower end 78 of rack 76 includes a clevis 80. This clevis is dimensioned to receive upper end 82 of gate 24. An aperture 84 is disposed in each of the legs defining clevis 80 and this aperture matingly corresponds with aperture 86 disposed in the upper end of the gate. A pin 88 is manually insertable through apertures 84 of clevis 80 and aperture 86 in upper end 82 when the clevis is in straddling engagement with the gate, as illustrated in FIGS. 2, 3, and 4. Thereby, pin 88 maintains the clevis in mechanical engagement with gate 24. Such mechanical engagement assures vertical movement of gate 24 in correspondence with vertical movement of rack 76 resulting from rotation of hand wheel 70.

In order to maintain gate 24 in the lowered position (see FIG. 3) a pin 90 is manually insertable through lower apertures 92 in legs 44 and 46 of pedestal 42 and through apertures 94 in upper end 82 of the gate. When so pinned, gate 24 is precluded from vertical movement and is locked in the lowered position. A pair of upper apertures 96 are also disposed in legs 44 and 46 of pedestal 42. These apertures, when aperture 94 of gate 24 is brought into alignment therewith and upon insertion of pin 90 therethrough, position the gate in the raised position and preclude any vertical movement of the gate. Thereby, pin 90, in combination with either apertures 92 or apertures 96, is employed to maintain the gate valve in the closed or open state irrespective of the presence of operator 12.

As an aid to facilitate insertion and withdrawal of pin 90 without simultaneously applying a force to hand wheel 70, the rack may be locked in place by off center mounted washer 95, as shown in FIG. 6. The washer is rotatably secured through an off center hole to gear box 66 by a bolt 98. By incremental rotation of the washer, it can be brought into interfering relationship with teeth 74 of rack 76. Such interference will preclude vertical movement of the rack during insertion or withdrawal of pin 90. Alternately, the washer may be centrally mounted and include a flat spot along its edge to avoid interference with the rack when the flat spot is in coincidence with the teeth of the rack.

Figure 5:
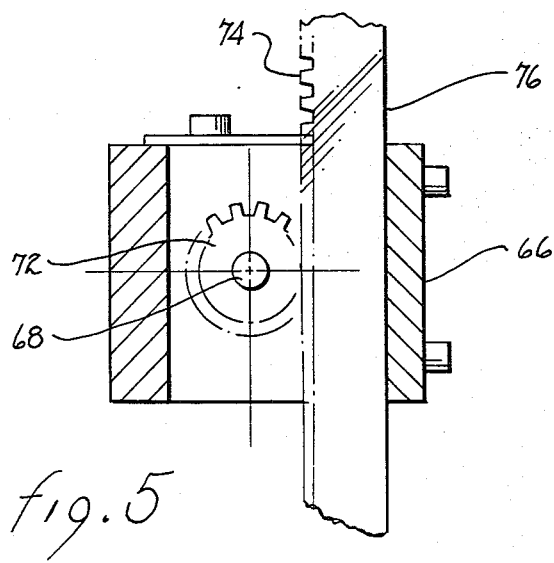
FIG. 5 is a cross-sectional view taken along lines 5—5, as shown in FIG. 6.

In operation, operator 12 is attached to gate valve 10 to permit manual raising or lowering of gate 24 whereafter the gate is pinned in place and the operator is removed from the gate valve. This result is effected by bringing member 58 of the operator into engagement with platform 56 of pedestal 42. After so positioning operator 12, rack 76 is raised or lowered to bring clevis 80 into engagement with the upper end of the gate. The clevis is pinned to gate 24 by means of pin 88 engaging apertures 84 and 86 in the clevis and gate, respectively. Upon such engagement and subsequent relief of forces acting upon pin 90 by slightly raising the rack, pin 90 is withdrawn. Withdrawal of the pin will permit vertical movement of the gate with respect to pedestal 42 upon turning of hand wheel 70. On rotation of hand wheel 70, rack 76 will be raised or lowered, depending upon the state to which the gate valve is to be changed. The closed state of the gate valve is illustrated in FIG. 5 and the open state of the gate valve is illustrated in FIG. 6.

Assuming that the gate valve were to be changed from a closed state to an open state, rack 76 would be raised until aperture 94 in the gate is brought into alignment with apertures 96 in the pedestal. Thereafter pin 90 would be inserted through the aligned apertures to physically lock the gate with the pedestal. An initial temporary locking in place of rack 76 may be undertaken by engaging washer 96 with the teeth of the rack. Since the weight of the gate is now supported by pin 90, pin 88 may be withdrawn to release clevis 80 from the gate. Thereafter, operator 12 may be removed by sliding disengagement between member 58 and platform 56.

At such time as the gate valve is to be closed, operator 12 would once again be brought into engagement with pedestal 42 and clevis 80 would be pinned to upper end 82 of the gate. On removal of pin 90 from aperture 96, the gate would be free to be lowered through rotation of hand wheel 70. After the gate has been positioned to bring the gate valve to the closed state, as illustrated in FIG. 5, aperture 96 in the gate would be brought into alignment with lower apertures 92 in legs 44 and 46 and pin 90 would be inserted therethrough. Upon such insertion, gate 24 would be locked in place and clevis 80 may be disengaged from the gate through removal of pin 88. After disengagement of the clevis, operator 12 may be once again removed.

By the use of a removable operator, a single operator may be used in conjunction with a plurality of gate valves. Thereby, the cost of each such gate valve is substantially reduced below the cost of a gate valve having a permanently attached operator. Moreover, the quality of the gate valve housing, chest, stuffing box and seals may be maintained at preferred quality levels without a cost detriment to insure acceptably low failure rates within any specified environment.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. A removable operator for a gate valve, said operator being serially readily useable in the field with each of a plurality of gate valves and thereby eliminate the need for having gate repositioning apparatus attendant to and continuously remain with each of the gate valves, said operator comprising in combination:
    (a) means for detachably attaching said operator to the gate valve;
    (b) positioning means for imparting translatory movement to the gate of the gate valve;
    (c) means for engaging said positioning means with the gate of the gate valve;
    (d) means for translating said positioning means; and
    (e) means for maintaining the gate in the opened or closed position upon removal of said operator;
   whereby, upon detachable attachment of said operator to the gate valve and on actuation of said positioning means, the gate of the gate valve is raiseable or lowerable to open or close the gate valve.

2. The operator as set forth in claim 1 including means for locking the gate to maintain the gate valve in the open or closed state after detachment of said operator.

3. The operator as set forth in claim 2 wherein the gate valve includes a pedestal extending from the gate valve and said attaching means comprises a member for engaging said pedestal.

4. The operator as set forth in claim 3 wherein said positioning means comprises a rectilinearly translatable rack.

5. The operator as set forth in claim 4 wherein said translating means comprises a manually rotatable pinion gear in engagement with said rack.

6. The operator as set forth in claim 5 wherein said translating means further comprises a handwheel and a rotatably mounted shaft supporting said pinion gear and said handwheel.

7. A removable operator for a gate valve, said operator comprising in combination:
    (a) means for detachably attaching said operator to the gate valve, said attaching means including a pedestal extending from the gate valve and a member for engaging said pedestal;
    (b) positioning means for imparting translatory movement to the gate of the gate valve, said positioning means comprising a rectilinearly translatable rack;

(c) means for engaging said positioning means with the gate of the gate valve;

(d) means for translating said positioning means, said translating means comprising a manually rotatable pinion gear in engagement with said rack, a handwheel and a rotatably mounted shaft supporting said pinion gear and said handwheel; and (e) means for locking the gate to maintain the gate valve in the open or closed state after detachment of said operator, said locking means including aperture means disposed in said pedestal, further aperture means disposed in the gate and pin means for penetrable insertion through both said aperture means in said pedestal and said further aperture means in the gate to lock the gate in place when the gate valve is in either the open state or the closed state;

whereby, upon detachable attachment of said operator to the gate valve and on actuation of said positioning means, the gate of the gate valve is raiseable or lowerable to open or close the gate valve.

8. The operator as set forth in claim 7 wherein said engaging means comprises an aperture at one end of said rack, a further aperture disposed in the gate and further pin means for insertion through said aperture and said further aperture.

9. The operator as set forth in claim 7 wherein said engaging means comprises a clevis at one end of said rack, an aperture disposed in the gate and a pin for interconnecting said clevis with said aperture.

10. The operator as set forth in claim 7 wherein said pedestal comprises a pair of legs extending upwardly from the gate valve in straddling relationship to the gate and a platform disposed at the top of said pair of legs.

11. The operator as set forth in claim 10 wherein said member includes a recess for receiving said platform of said pedestal.

12. The operator as set forth in claim 11 wherein said member includes means for journaling said shaft and a slot for penetrably receiving said rack.

13. The operator as set forth in claim 12 wherein said member further includes means for positionally securing said rack with respect to said member.

14. A gate valve and operator assembly, said operator being serially readily useable in the field with each of a plurality of said gate valves and thereby eliminate the need for having gate repositioning apparatus attendant to and continuously remain with each of said gate valves, said assembly comprising in combination:

(a) a gate valve comprising:
  i. a gate valve housing, including a gate, a seat for said gate and a stuffing box; and
  ii. means for supporting a removable operator;

(b) said removable operator comprising:
  i. means for detachably engaging said supporting means;
  ii. positioning means for imparting translatory movement to said gate;
  iii. means for engaging said positioning means with said gate; and
  iv. means for translating said positioning means;

(c) means for maintaining the gate in the opened or closed position upon removal of said operator;

whereby, upon detachable attachment of said operator to said gate valve and on actuation of said translating means, translatory movement of said gate with respect to said seat and said stuffing box may be effected to open and close said gate valve.

15. The assembly as set forth in claim 14 including means for locking said gate to maintain said gate valve in the open or closed state after detachment of said operator.

16. The assembly as set forth in claim 15 wherein said supporting means comprises a pedestal extending from said gate valve and wherein said engaging means comprises a member for engaging said pedestal.

17. The assembly as set forth in claim 16 wherein said positioning means comprises a rectilinearly translatable rack.

18. The assembly as set forth in claim 17 wherein said translating means comprises a pinion gear in engagement with said rack, a handwheel and a rotatably mounted shaft interconnecting said pinion gear and said handwheel.

19. A gate valve and operator assembly comprising in combination:

(a) a gate valve comprising:
  i. a gate valve housing, including a gate, a seat for said gate and a stuffing box; and
  ii. means for supporting a removable operator, said supporting means comprising a pedestal extending from said gate valve;

(b) said removable operator comprising;
  i. means for detachably engaging said supporting means;
  ii. positioning means for imparting translatory movement to said gate, said positioning means comprising a rectilinearly translatable rack;
  iii. means for engaging said positioning means with said gate, said engaging means comprising a member for engaging said pedestal;
  iv. means for translating said positioning means, said translating means comprising a pinion gear in engagement with said rack, a handwheel on a rotatably mounted shaft interconnecting said pinion gear and said handwheel;

(c) means for locking said gate to maintain the gate valve in the open or closed state after detachment of said operator, said locking means comprising aperture means disposed in said pedestal, further aperture means disposed in said gate and pin means for penetrable insertion through both said aperture means in said pedestal and said further aperture means in said gate to lock said gate in place when said gate valve is in either the open state or the closed state;

whereby, upon detachable attachment of said operator to said gate valve and on actuation of said translating means, translatory movement of said gate with respect to said seat and said stuffing box may be effected to open and close said gate valve.

20. The assembly as set forth in claim 19 wherein said engaging means comprises an aperture at one end of said rack, a further aperture disposed in said gate and further pin means for insertion through said aperture and said further aperture.

21. The assembly as set forth in claim 19 wherein said engaging means comprises a clevis at one end of said rack, an aperture disposed in the gate and a pin for interconnecting said clevis with said aperture.

22. The assembly as set forth in claim 19 wherein said member includes means for journaling said shaft and a slot for penetrably receiving said rack.

23. The assembly as set forth in claim 22 wherein said member further includes means for positionally securing said rack with respect to said member.

24. A gate valve and operator assembly comprising in combination:
  (a) a gate valve comprising:
    i. a gate valve housing, including a gate, a seat for said gate and a stuffing box; and
    ii. means for supporting a removable operator, said supporting means comprising a pedestal including a pair of legs extending upwardly from said gate valve in straddling relationship to said gate and said stuffing box and a platform for engaging said member, said member including a recess for receiving said platform;
  (b) said removable operator comprising:
    i. means for detachably engaging said supporting means;
    ii. positioning means for imparting translatory movement to said gate;
    iii. means for engaging said positioning means for engaging said positioning means with said gate; and
    iv. means for translating said positioning means;
  (c) means for locking said gate to maintain said gate valve in the open or closed state after detachment of said operator;
whereby, upon detachable attachment of said operator to said gate valve and on actuation of said translating means, translatory movement of said gate with respect to said seat and said stuffing box may be effected to open and close said gate valve.

* * * * *